US008721123B2

(12) United States Patent
Calmes

(10) Patent No.: US 8,721,123 B2
(45) Date of Patent: May 13, 2014

(54) PATTERN GENERATOR FOR A LIGHT FIXTURE

(75) Inventor: Jack Calmes, Dallas, TX (US)

(73) Assignee: Syncrolite, LLC, Dallas, TX (US)

( * ) Notice: Subject to any disclaimer, the term of this patent is extended or adjusted under 35 U.S.C. 154(b) by 179 days.

(21) Appl. No.: 12/355,076

(22) Filed: Jan. 16, 2009

(65) Prior Publication Data

US 2009/0196042 A1 Aug. 6, 2009

Related U.S. Application Data

(60) Provisional application No. 61/011,557, filed on Jan. 18, 2008.

(51) Int. Cl.
*B60Q 1/14* (2006.01)

(52) U.S. Cl.
USPC ............................ 362/278; 362/320; 359/890

(58) Field of Classification Search
USPC .......... 362/18, 97.4, 276, 277, 278, 281–284, 362/293, 319–321, 323, 324, 351; 359/233, 359/888–890; 40/47, 361, 466, 470, 471, 40/518; 463/20, 143
See application file for complete search history.

(56) References Cited

U.S. PATENT DOCUMENTS

| | | | |
|---|---|---|---|
| 708,770 A | 9/1902 | Johnson | |
| 745,424 A | 12/1903 | Davis | |
| 2,754,605 A | 7/1956 | Berkeley | |
| 3,237,513 A | 3/1966 | Dreyfoos et al. | |
| 4,078,492 A | 3/1978 | Levy et al. | |
| 4,325,630 A | 4/1982 | Kimura et al. | |
| 4,459,014 A | 7/1984 | Thebault | |
| 4,510,708 A * | 4/1985 | Pokrinchak | 40/361 |
| 4,697,227 A | 9/1987 | Callahan | |
| 4,745,531 A | 5/1988 | Leclercq | |
| 4,754,297 A | 6/1988 | Edwards | |

(Continued)

FOREIGN PATENT DOCUMENTS

| | | |
|---|---|---|
| DE | 295 06 211 U1 | 8/1995 |
| DE | 297 16 264 U1 | 1/1998 |

(Continued)

OTHER PUBLICATIONS

Office Action issued by the United States Patent and Trademark Office on Sep. 22, 2009 in connection with U.S. Appl. No. 11/260,501.
Office Action dated Jan. 9, 2009 in connection with Chinese Patent Application No. 200680027049.
Written Opinion of the International Searching Authority and International Search Report dated Apr. 3, 2008 in connection with PCT Application No. PCT/US07/23343.

(Continued)

*Primary Examiner* — Hargobind S Sawhney
(74) *Attorney, Agent, or Firm* — Carter Scholer Arnett Hamada & Mockler, PLLC

(57) ABSTRACT

An apparatus includes a first flexible material that has a first area with a first texture that produces a first predetermined amount of diffusion of a beam of light, where the first texture produces at least some diffusion in the beam of light. The apparatus also includes a second flexible material attached to a first portion of the first area, where the second flexible material reduces the amount of diffusion of the beam of light produced by the first texture of the first portion of the first area. A light fixture includes a light fixture and the first flexible material coupled to a scrolling mechanism. The scrolling mechanism is operable to position a selected area of the first flexible material such that a beam of light from the light source passes through a first area of the first flexible material.

20 Claims, 7 Drawing Sheets

(56) References Cited

U.S. PATENT DOCUMENTS

| | | | | |
|---|---|---|---|---|
| 4,775,918 | A | 10/1988 | Snyder | |
| 4,984,143 | A | 1/1991 | Richardson | |
| 5,126,886 | A | 6/1992 | Richardson et al. | |
| 5,365,354 | A | 11/1994 | Jannson et al. | |
| 5,530,571 | A | 6/1996 | Chen | |
| 5,534,386 | A | 7/1996 | Petersen et al. | |
| 5,609,939 | A | 3/1997 | Petersen et al. | |
| 5,796,499 | A | 8/1998 | Wenyon | |
| 5,816,681 | A | 10/1998 | Tedesco | |
| 5,825,548 | A | 10/1998 | Bornhorst et al. | |
| 6,048,080 | A | 4/2000 | Belliveau | |
| 6,132,072 | A | 10/2000 | Turnbull et al. | |
| 6,158,245 | A | 12/2000 | Savant | |
| 6,177,761 | B1 | 1/2001 | Pelka et al. | |
| 6,278,563 | B1 | 8/2001 | Hewlett | |
| 6,285,503 | B1 | 9/2001 | Chao et al. | |
| 6,428,322 | B1 | 8/2002 | Tanaka | |
| 6,445,504 | B1 | 9/2002 | Suga et al. | |
| 6,505,959 | B2 | 1/2003 | Masaki et al. | |
| 6,642,969 | B2 | 11/2003 | Tew | |
| 6,752,505 | B2 | 6/2004 | Parker et al. | |
| 6,796,683 | B2 | 9/2004 | Wood et al. | |
| 6,891,686 | B2 | 5/2005 | Hewlett | |
| 7,090,389 | B2 * | 8/2006 | Parker et al. | 362/627 |
| 7,364,341 | B2 * | 4/2008 | Parker et al. | 362/620 |
| 7,468,203 | B2 | 12/2008 | Hicks et al. | |
| 7,703,947 | B2 | 4/2010 | Calmes et al. | |
| 2002/0039632 | A1 | 4/2002 | Hicks | |
| 2003/0206414 | A1 | 11/2003 | Wood et al. | |
| 2006/0193641 | A1 | 8/2006 | Callahan | |
| 2006/0268558 | A1 * | 11/2006 | Calmes | 362/382 |
| 2007/0068991 | A1 | 3/2007 | Handel et al. | |
| 2007/0222914 | A1 | 9/2007 | Kotchick et al. | |
| 2008/0024870 | A1 | 1/2008 | Bourdelaia et al. | |
| 2008/0062686 | A1 | 3/2008 | Hoelen et al. | |
| 2010/0026727 | A1 * | 2/2010 | Bita et al. | 345/690 |

FOREIGN PATENT DOCUMENTS

| | | | |
|---|---|---|---|
| EP | 0 463 204 | A1 | 1/1992 |
| EP | 0 652 400 | A1 | 5/1995 |
| GB | 2 311 874 | A1 | 10/1997 |
| JP | 61288302 | A | 12/1986 |
| JP | 64021909 | U | 2/1989 |
| JP | 2152104 | A | 6/1990 |
| JP | 2297802 | A | 12/1990 |
| JP | 05-11201 | | 2/1993 |
| JP | 9152553 | A | 6/1997 |
| JP | 10301511 | A | 11/1998 |
| JP | 2000030507 | A | 1/2000 |
| JP | 2004355934 | A | 12/2004 |
| JP | 2005017379 | A | 1/2005 |

OTHER PUBLICATIONS

Notification Concerning Transmittal of International Preliminary Report on Patentability dated Dec. 13, 2007 in PCT Application No. PCT/US2006/020186.

Communication pursuant to Article 94(3) EPC dated Apr. 2, 2008 in European Patent Application No. 06 760 364.7.

Notification of Transmittal of the International Search Report and the Written Opinion of the International Searching Authority, or the Declaration dated Apr. 7, 2009 in connection with PCT Application No. PCT/US09/31296.

Notification of Transmittal of the International Search Report and the Written Opinion of the International Searching Authority, or the Declaration dated Apr. 8, 2009 in connection with PCT Application No. PCT/US09/31604.

Notification of Transmittal of the International Search Report and the Written Opinion of the International Searching Authority, or the Declaration dated Apr. 30, 2009 in connection with PCT Application No. PCT/US09/31319.

Communication pursuant to Article 94(3) EPC dated Oct. 7, 2008 in European Patent Application No. 06 760 364.7.

Office Action dated Jun. 10, 2009 in connection with U.S. Appl. No. 11/260,501.

Advisory Action dated Feb. 25, 2009 in connection with U.S. Appl. No. 11/260,501.

Office Action dated Dec. 3, 2008 in connection with U.S. Appl. No. 11/260,501.

Office Action dated Jul. 10, 2008 in connection with U.S. Appl. No. 11/260,501.

Office Action dated Dec. 8, 2011 in connection with U.S. Appl. No. 12/357,247.

Office Action dated Dec. 8, 2011 in connection with U.S. Appl. No. 12/358,138.

Notification of Transmittal of the International Search Report and the Written Opinion of the International Searching Authority, or the Declaration dated Feb. 21, 2012 in connection with International Patent Application No. PCT/US09/31730.

Office Action dated May 9, 2012 in connection with U.S. Appl. No. 12/358,138.

Office Action dated Oct. 25, 2012 in connection with U.S. Appl. No. 12/358,138.

Office Action dated Aug. 2, 2012 in connection with U.S. Appl. No. 12/357,247.

Office Action dated Apr. 9, 2013 in connection with U.S. Appl. No. 12/357,247.

Office Action dated Jun. 21, 2013 in connection with U.S. Appl. No. 12/358,138.

Office Action dated Jul. 27, 2011 connection with U.S. Appl. No. 12/357,247.

Office Action dated Jul. 22, 2011 connection with Japanese Patent Application No. 2008-513694.

* cited by examiner

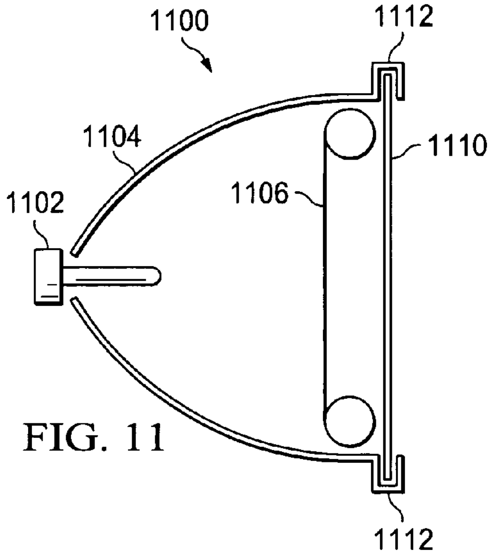
FIG. 11
FIG. 12A
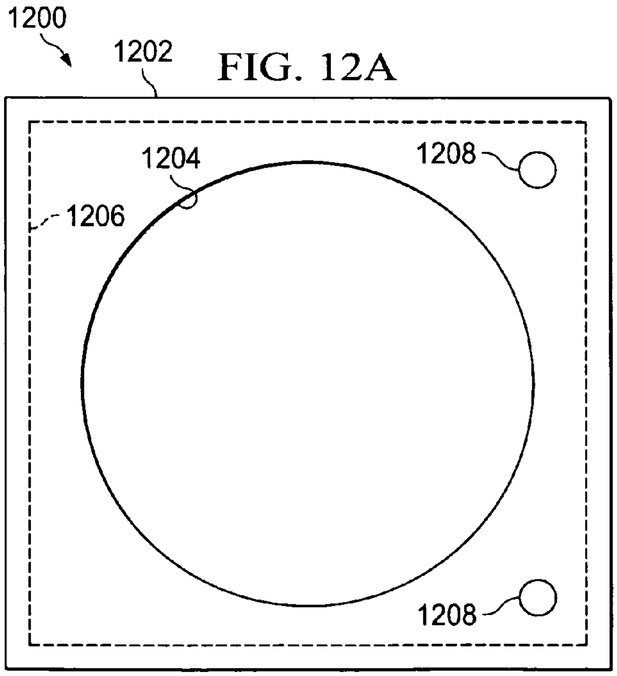
FIG. 12B
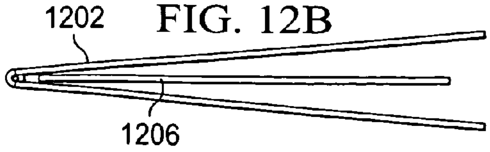
FIG. 12C
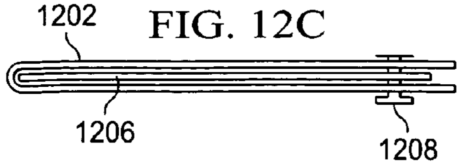

PATTERN GENERATOR FOR A LIGHT FIXTURE

CROSS-REFERENCE TO RELATED APPLICATIONS

The present application is related to and claims priority to U.S. Provisional Patent Application Ser. No. 61/011,557, entitled "Method and Apparatus for Controlling Diffusion and Color of a Light Beam," filed on Jan. 18, 2008, which is assigned to the assignee of the present application. The subject matter disclosed in Provisional Patent Application Ser. No. 61/011,557 is hereby incorporated by reference into the present disclosure as if fully set forth herein. The present application hereby claims priority under 35 U.S.C. §119(e) to U.S. Provisional Patent Application Ser. No. 61/011,557.

TECHNICAL FIELD

The present invention relates to automated lighting equipment, and in particular, to a PATTERN GENERATOR FOR A LIGHTING FIXTURE.

BACKGROUND

Traditionally, the spread or diffusion of a lighting fixture has been controlled by placing a lens, ground glass or other optical component in the path of light produced by the light source. The optical component may be made of glass, plastic or other suitable material. In order to control the amount of diffusion, the lens may be motorized and moved to different locations along the axis of the light path or moved relative to other optical components in the light path. Alternatively, a selection of lenses may be mounted on a wheel or semaphore arms to be placed into and removed from the light path.

Particularly where such lenses are positioned at the outlet, or mouth, of the fixture, their weight and the weight of mechanisms to move them may unbalance the head of the fixture. This imbalance may make an automated lighting fixture more difficult to move, causing overshoot when stopping or limiting the maximum speed at which the can be moved.

Lighting fixtures employing a parabolic or near-parabolic reflector emit a light beam comprised of substantially parallel light rays. As a result, when only a portion of the light beam emerging from the reflector is covered by a color filter, in an attempt to produce a light beam of variable saturation, some parts of the projected light beam are colored and the remainder is white. Similarly, when one portion of the light beam emerging from the reflector is covered by a first color filter and the remainder of the light beam is covered by a second color filter, in an attempt to produce a light beam of variable color, some parts of the projected light beam have the first color and the remaining parts have the second color.

SUMMARY

A first embodiment of the present invention provides an apparatus that includes a first flexible material. The first flexible material includes a first area that has a first texture that produces a first predetermined amount of diffusion of a beam of light, where the first texture produces at least some diffusion in the beam of light. The apparatus also includes a second flexible material attached to a first portion of the first area, where the second flexible material reduces the amount of diffusion of the beam of light produced by the first texture of the first portion of the first area.

Another embodiment of the present invention provides a light fixture that includes a light source and a first flexible material coupled to a first scrolling mechanism. The first scrolling mechanism is operable to position a selected area of the first flexible material such that a beam of light from the light source passes through a first area of the first flexible material. The first area has a first texture that produces a first predetermined amount of diffusion of the beam of light, where the first texture produces at least some diffusion in the beam of light. The light fixture also includes a second flexible material attached to a first portion of the first area, where the second flexible material reduces the amount of diffusion of the beam of light produced by the first texture of the first portion of the first area.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the invention. Those skilled in the art should also realize that such equivalent constructions do not depart from the spirit and scope of the invention in its broadest form.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as to future uses, of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, in which:

FIG. 11 shows another embodiment of the invention;

FIGS. 12A-C depict a flexible diffusion material frame for use with the embodiment of the invention shown in FIG. 11;

DETAILED DESCRIPTION

FIGS. 1 through 14, discussed below, and the various embodiments used to describe the principles of the present invention in this patent document are by way of illustration only and should not be construed in any way to limit the scope of the invention. Those skilled in the art will understand that the principles of the invention may be implemented in any suitably arranged wireless communications network.

Figure 1:
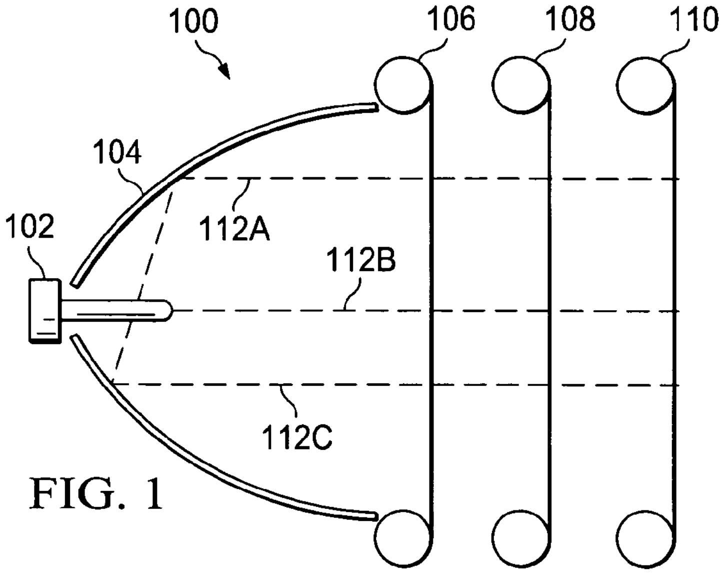
FIG. 1 shows a schematic view of an automated lighting fixture in accordance with the invention.

FIG. 1 shows a schematic view of an automated lighting fixture in accordance with the invention. A lamp 102 is mounted near the focal point of a parabolic or near-parabolic reflector 104. Scrolling mechanisms 106, 108 and 110 are mounted across the outlet aperture of the parabolic reflector 104. In this position, the flexible material carried by the scrolling mechanisms 106, 108 and 110 intercepts light rays 112A-C emitted by the bulb 102. The light ray 112A passes directly from the bulb to the mouth of the lighting fixture 100, while the light rays 112B and 112C reflect from the reflector 104 before emitting from the mouth of the lighting fixture 100.

The flexible material carried by the scrolling mechanism 110 may be flexible diffuser material in accordance with the invention. The flexible material carried by the scrolling mechanisms 106 and 108 may be color filter material. The color filter material may be fabricated as a dichroic filter, which has the benefit that substantially all light at frequencies not passed by the filter are reflected, rather than absorbed. As a result, the filter material stays cooler and requires less frequent replacement. Alternatively, the color filter material may be fabricated from conventional color gels.

While lighting fixture 100 is depicted with a parabolic reflector, it will be understood that a scrolling diffuser according to the invention may also be used with a light fixture having an elliptical reflector or no reflector at all. Similarly a scrolling diffuser according to the invention may be used with a light fixture having any type of light source: e.g., LED, filament or arc source. A light fixture according to the invention may be used, for example, in theatrical, concert, motion picture, and architectural lighting applications.

The flexible diffuser material used in scrolling mechanism 110 may be a holographic diffuser, such as LSD® Light Shaping Diffuser Film, manufactured by Physical Optics Corporation of Torrance, Calif. A light-shaping diffuser film may be an array of microlenses imprinted on a surface of a flexible film, typically polyester or polycarbonate. The microlenses diffuse light passing through the array in a predetermined angle. Other flexible diffusion material may additionally or alternatively be used without departing from the spirit and scope of the invention.

Figure 2:
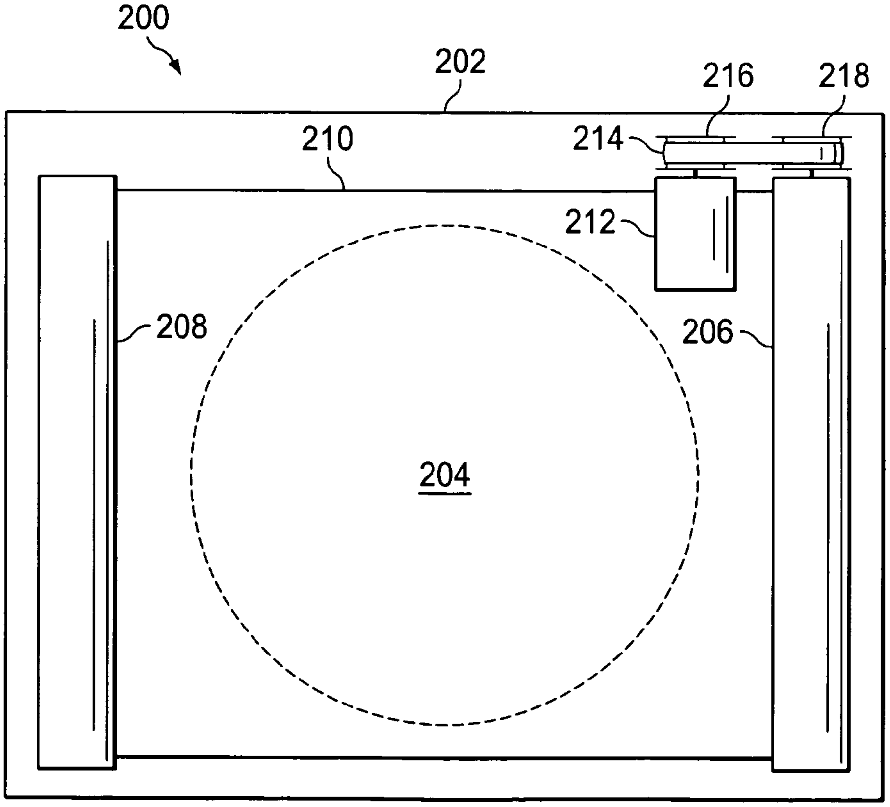
FIG. 2 is a back view of a scrolling mechanism for use in the light fixture of FIG. 1.

FIG. 2 presents a back view of a scrolling mechanism 200 suitable for use in the light fixture of FIG. 1 as scrolling mechanism 110. A housing 202 may provide mechanical support for components of the scrolling mechanism 110. An aperture 204 in the housing 202 allows a light beam from the light source 102 (including light rays 112A-C) to pass through the housing 202 and a flexible diffusion material 210.

The diffusion material 210 is wrapped at opposite ends around rollers 206 and 208. A motor 212 drives the roller 206 via a belt 214 and pulleys 216 and 218. The roller 208 may be spring loaded to maintain the diffuser material 210 in tension between the rollers 206 and 208. The motor 212 may be remotely controlled by techniques known the person of skill in the art to wrap or unwrap the diffusion material 210 around the roller 206 in order to position a desired area of the diffusion material 210 across the aperture 204 and, thus, across the light beam from light source 102.

Figure 3:
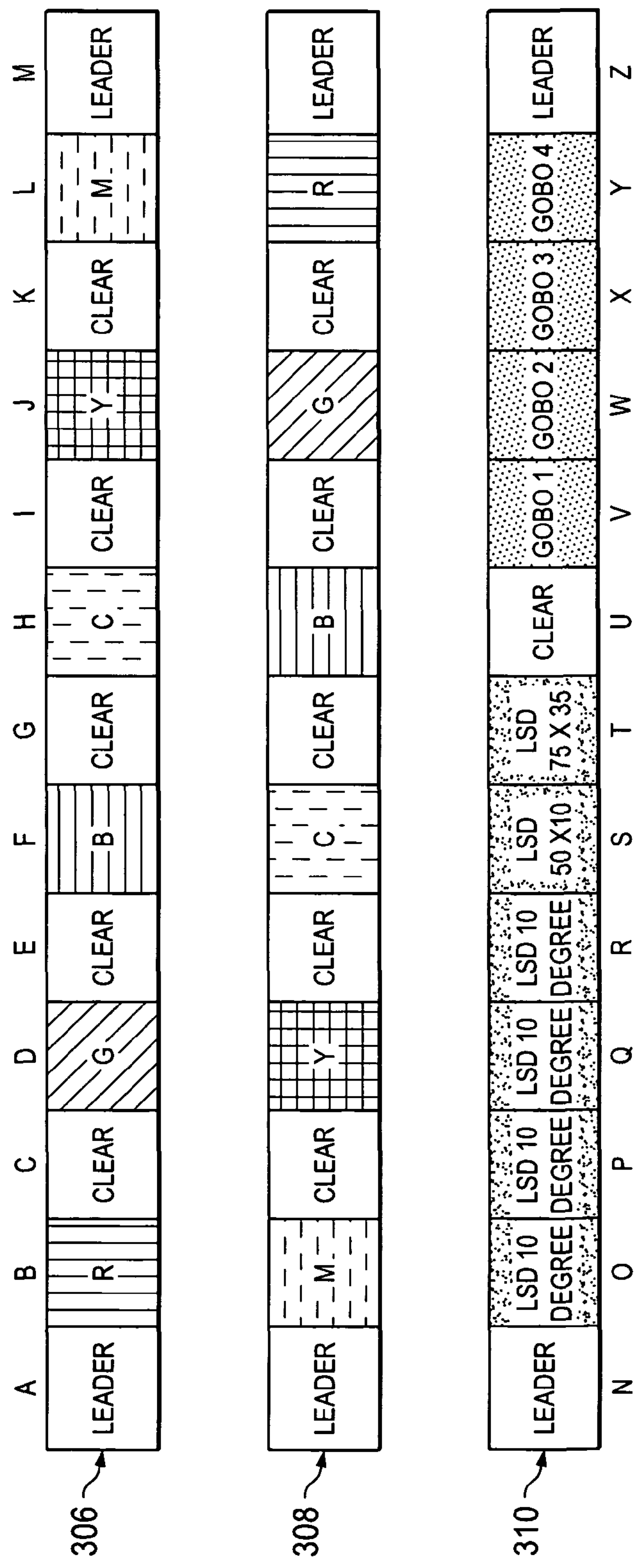
FIG. 3 shows color and diffusion strings that may be used in the embodiment of the invention shown in FIG. 1.

FIG. 3 illustrates color filter and diffusion material (or strings) that may be used in the scrolling mechanisms of the lighting fixture 100. Color filter strings 306 and 308 may be installed in the scrolling mechanisms 106 and 108, respectively. Diffusion string 310 may be installed in the scrolling mechanism 110. In a manner to be described with regard to FIGS. 4-6, the scrolling mechanisms 106 and 108 may be operated to position selected areas of the color filter strings 306 and 308, respectively, and the scrolling mechanism 110 may be operated to position a selected area of the diffusion string 310, across the outlet of the reflector 104, in the light beam from the light source 102 and the reflector 104.

The color filter string 306 is illustrated as having panels A-M. The panels A and M comprise leader material, used to attach the color filter string 306 to the rollers of the scrolling mechanism 106. The panels C, E, G, I and K comprise clear material, which does not color the light beam from the light source 102. The panels B, D, F, H, J and L comprise filter material of different colors. For example, the panels B, D, F, H, J and L may comprise red, green, blue, cyan, yellow and magenta filters, respectively. The panels B-L are substantially square, having vertical and horizontal dimensions substantially equal to (or slightly larger than) the diameter of the mouth of the reflector 104. In this way, the scrolling mechanism 106 may be operated to position any of the panels B-L completely across the mouth of the reflector 104, with the result that the light beam from the light source 102 is completely colored or uncolored.

In the alternative, scrolling mechanism 106 may be operated to position any desired area of color filter string 306 across the mouth of the reflector 104. For example, a portion of a colored panel (e.g., the panel F) and a portion of an adjacent clear panel (either the panel E or G) may be positioned across the mouth of reflector 104. In this way, part of the light beam will be colored and the remainder will remain uncolored.

Color filter string 308, as shown, may be fabricated in a fashion similar to the color string 306. Likewise, scrolling mechanism 108 may be used to position any desired area of color filter string 308 across the mouth of reflector 104. In this way, any desired colored or clear section (or portions thereof) from color filter string 306 and any desired colored or clear section (or portions thereof) from color filter string 308 may be combined in the beam of light emerging from reflector 104. In a manner to be described with regard to FIGS. 4-6, this provides control of the color and saturation of the light beam produced by lighting fixture 100.

The color strings 306 and 308 of FIG. 3 illustrate distinct boundaries between panels that are perpendicular to the sides of the color strings. It will be understood, however, that other boundaries between panels may be used without departing from the spirit and scope of the invention. For example, a diagonal boundary or a sawtooth edge to a panel may be used.

Indeed, either of the color strings 306 and 308 may be fabricated without distinct boundaries at all. A gradual transition between an area of color filter and a clear area (or between adjacent areas having different color filters, as will be shown with regard to FIG. 10) may, for example, be fabricated as a pattern of disjoint regions of clear material, interspersed with conjoined regions of color filter material. The density of clear regions may increase until, at some point, the regions of clear material become conjoined and the regions of color filter material become disjoint. The density of color filter regions may then decrease until the gradual transition from color filter to clear is complete. It will be understood that other techniques known in the art may be used to produce gradual transitions from colored to clear, or from one color to another color.

Diffusion/pattern string 310 is illustrated as having panels N-Z. The panels N and Z comprise leader material, used to attach the diffusion/pattern string 310 to the rollers of the scrolling mechanism 110. The panels O-T may comprise, for example, holographic lens material such as the LSD® Light Shaping Diffuser Film, manufactured by Physical Optics Corporation of Torrance, Calif. The panels O-R may comprise material selected to provide a graduated sequence of increasing omni-directional diffusion, producing round beams of increasing degrees of divergence. The panels S and T may comprise material providing differing amounts of divergence in the horizontal and vertical directions, producing rectangular beams of differing degrees of divergence.

One or more of the panels V-Y may comprise "color correction" color filter material chosen to correct the color temperature of the bulb 102 as required for video or film lighting. Other ones of the panels V-Y may comprise pattern-generating material. This material may comprise selected portions of opaque or colored materials bonded to a clear substrate. When such a pattern generator is placed across the mouth of the reflector 104, a light beam with a pattern of white and dark or colored segments is produced. Panel U may comprise clear material that produces neither diffusion nor a pattern, thereby passing the light beam with substantially parallel light rays, as produced by the parabolic reflector 104.

Thus, the scrolling mechanism 110 may be operated to position any of the panels O-Y across the mouth of the reflector 104. The panels O-T, as described, may operate to integrate a partially colored light beam produced by the scrolling mechanisms 106 and 108, and to diffuse the light beam to a predetermined degree of divergence. The panel U, as described, may leave the light beam unchanged as it passes through the scrolling mechanism 110. The panels V-Y, as described, may operate to color correct the light beam or to introduce a pattern in the light beam.

As described with regard to the color strings 306 and 308, the diffusion/pattern string 310 may be fabricated with transitions between panels other than the distinct, perpendicular boundaries shown in FIG. 3. Such gradual transitions or non-perpendicular boundaries may operate to smooth the change from one amount of diffusion to another or from one pattern to another. As will be described with regard to FIG. 8, a single pattern may in fact extend across an area of the diffusion/pattern string 310 that is the size of two or more panels, as shown in FIG. 3.

Figure 4:
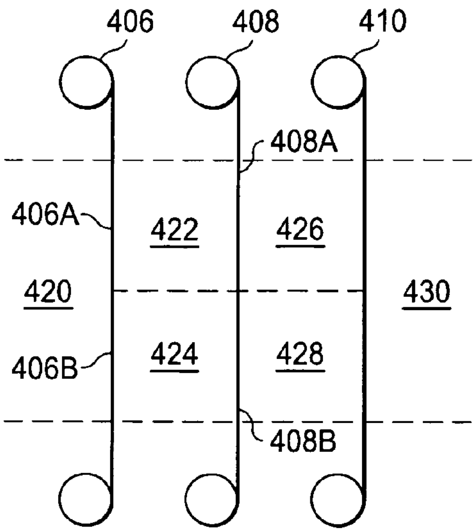
FIGS. 4-6 are schematic illustrations of the operation of the embodiment of the invention shown in FIG. 1.
Figure 5:
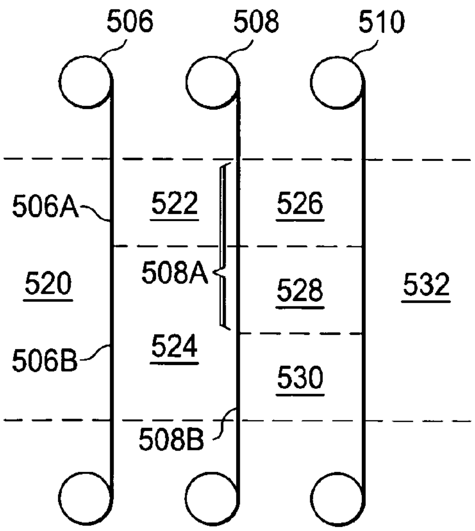
Figure 6:
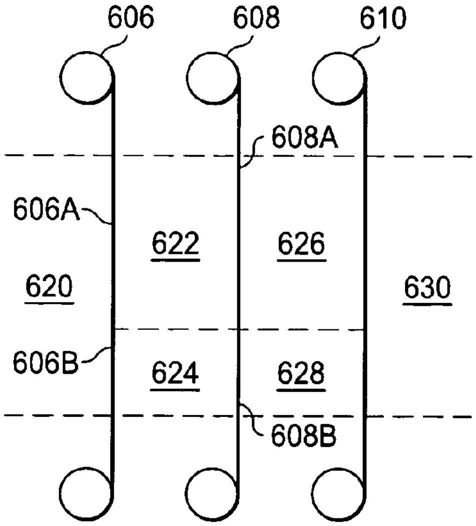

FIGS. 4-6 illustrate the embodiment of the invention shown in FIG. 1 in operation. In FIG. 4, scrolling mechanisms 406, 408 and 410 are analogous to scrolling mechanisms 106, 108 and 110, respectively. Scrolling mechanisms 406 and 408 operate to position color filter strings across light beam 420 and scrolling mechanism 410 operates to position a diffusion/pattern string across the light beam.

FIG. 4 illustrates the ability of an embodiment of the invention to mix colors additively, and to control the color and saturation of the light beam individually. A scrolling mechanism 406 has been operated to position red filter material (portion 406A) across part of a white light beam 420, and clear material (portion 406B) over the remainder of the light beam 420. As a result, a part 422 of the light beam is colored red, while a part 424 remains white.

Scrolling mechanism 408 has been operated to position clear material (portion 408A) to cover the part 422 of the light beam, and blue filter material (portion 408B) over the part 424 of the light beam. As a result, a part 426 of the light beam remains red, while a part 428 of the light beam is now blue. Scrolling mechanism 410 has been operated to position diffusion material across the light beam, resulting in the blending of the red and blue parts of the light beam into a magenta light beam 430.

Were the scrolling mechanisms 406 and 408 to be operated in conjunction to increase the part of the light beam covered by the portions 406A and 408A, thereby decreasing the part of the light beam covered by the portions 406B and 408B, the result would be a change in the color of the light beam 430. The color of the beam would have more red and less blue, resulting in a rose color. Alternatively, if the part of the light beam covered by the portions 406A and 408A were decreased and the part covered by the portions 406B and 408B were correspondingly increased, the light beam 430 would have more blue and less red, resulting in a lavender color. Thus, the scrolling mechanisms 406 and 408 may be operated to change the color of the light beam produced by the lighting fixture 100.

In the alternative, the scrolling mechanism 406 may be operated to position clear material completely across the white light beam 420. In this circumstance, both the portions 406A and 406B would comprise clear material, and both the parts 422 and 424 of the light beam would remain white. If the scrolling mechanism 408 were again to position clear material (the portion 408A) over part of the light beam and blue filter material (the portion 408B) over the remainder of the light beam, then the part 426 of the light beam would remain white while the part 428 of the light beam would be blue. The diffusion material positioned over the beam by the scrolling mechanism 410 would then integrate the multi-colored light beam, and the light beam 430 would have a pale blue color.

If the scrolling mechanism 408 were operated to position more or less of the blue filter material 408B across the beam, the result would be, respectively, a more or less saturated blue color in the light beam 430. Thus, the scrolling mechanisms 406 and 408 may be operated to change the saturation of the light beam produced by the lighting fixture 100.

FIG. 5 illustrates the ability of an embodiment of the invention to control the color and saturation of the light beam together. A scrolling mechanism 506 has been operated to position red filter material (portion 506A) over part of a white light beam 520, and clear material (portion 506B) over the remainder of the white light beam 520. As a result, a part 522 of the light beam is colored red, while a part 524 remains white.

A scrolling mechanism 508 has been operated to position clear material (section 508A) to cover the part 522 and a subpart of the part 524 of the light beam, and blue filter material (section 508B) over the remainder of the part 524 of the light beam. As a result, a portion 526 of the light beam remains red, a portion 528 of the light beam remains white, and a portion 530 of the light beam is blue.

A scrolling mechanism 510 has again been operated to position diffusion material across the light beam, resulting in the blending of the red, white and blue portions of the light beam into a pale magenta light beam 532. The inclusion of white light, along with the red and blue portions of the beam, produces a less saturated color than that produced by the configuration shown in FIG. 4.

As described with regard to FIG. 4, the scrolling mechanisms 506 and 508 may be operated independently or in conjunction to control the relative sizes of the parts 526, 528 and 530. By so doing, more or less red, white and blue light may be mixed in the light beam 532 to produced a more or less saturated color and to produce a color ranging from rose through magenta to lavender. Thus, the scrolling mechanisms 506 and 508 may be operated to concurrently change the color and saturation of the light beam produced by lighting fixture 100.

FIG. 6 illustrates the ability of an embodiment of the invention to mix colors subtractively, and to control the color and saturation of the light beam either individually or concurrently. A scrolling mechanism 606 has been operated to position magenta filter material (section 606A) over a part of a white light beam 620, and clear material (section 606B) over the remainder of the light beam 620. The magenta filter removes green, passing red and blue, so a part 622 of the light beam is colored magenta, while a part 624 of the light beam remains white.

A scrolling mechanism 608 has been operated to position yellow material (section 608A) to cover the part 622 of the light beam, and clear filter material (section 608B) over the part 624 of the light beam. The yellow filter removes blue, passing green and red. Because the part 622 of the light beam has only red and blue in it, after passing through the yellow filter, a part 626 of the light beam is red. A part 628 of the light beam remains white. A scrolling mechanism 610 has again been operated to position diffusion material across the light beam, resulting in the blending of the red and white portions of the light beam into a pale red light beam 630.

The saturation of the light beam 630 may be controlled by operating the scrolling mechanism 606 to position more or less of the magenta filter 606A across the white light beam 620, thereby passing less or more white light, respectively. If the scrolling mechanism 608 is operated in conjunction to continue covering all of the part 622 of the light beam with the yellow filter 608A, the blended light beam 630 will remain red, while increasing or decreasing in saturation, respectively.

In the alternative, if the scrolling mechanism 608 is operated independently to cover only a subpart of the part 622 of the light beam with the yellow filter 608A, then a three part light beam will be created. The portion of the light beam passing through both the magenta and yellow filters will contain only red light, the portion passing through only the magenta filter will contain red and blue light, and the portion passing through neither filter will remain white. The scrolling mechanisms 606 and 608 may thus be operated independently to include desired relative amounts of red, blue and white light in the blended light beam 630. As described with regard to FIG. 5, the color and saturation of the light beam produced by lighting fixture 100 may thus be controlled.

While additive color mixing has been illustrated by combining red and blue light, and subtractive color mixing by combining magenta and yellow filters, it will be understood that any combination of the standard RGB additive colors may be used in additive color mixing, or any combination of the CYM subtractive colors in subtractive color mixing without departing from the spirit and scope of the invention. Furthermore, hybrid colors may be created by using filters from the RGB set in subtractive combination with filters from the CYM set, or by using filters from the CYM set in additive combination with filters from the RGB set. For example, the blue filter from the RGB set could be used subtractively with magenta from the CYM set to produce a very deep near-ultraviolet color. Alternatively, a broad range of pinks and roses may be created by using the magenta filter from the CYM set, abutted with the red filter from the RGB set, and moving them together in inversely varying percentages of the two filters.

Figure 7:
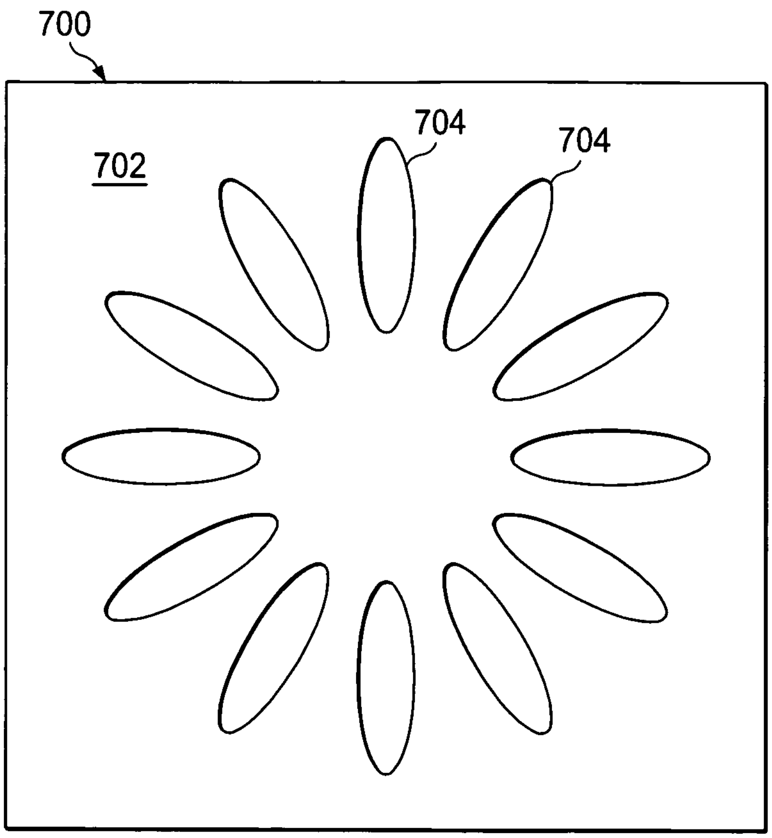
FIGS. 7 and 8 depict pattern generators that may be used in an embodiment of the invention.

FIG. 7 depicts a pattern generator 700 for use with an embodiment of the invention. Sections 704 may be fabricated on clear substrate 702 by applying a reflective Mylar material to clear gel material. In this way a beam 'broken up' by 12 dark segments is formed. While separate opaque sections 704 are shown in FIG. 7, in another embodiment, a sheet of reflective Mylar the same size as clear substrate 702 may be fabricated with cutouts 704 and bonded to the substrate 702. In this way a beam made up of 12 light segments could be formed.

In still other embodiments of a pattern generator according to the embodiment of FIG. 7, a light-shaping diffuser film may be used as the substrate 702. The diffusing effect of the film's microlenses may be "defeated" by applying an optically transparent or translucent viscous material to the imprinted (or "textured") side of the film in sections 704. The viscous material fills the impressions of the microlenses and allows substantially undiffused transmission of the light beam at that point. Application of adhesive-backed clear films, therefore, results in the defeating of the lensing wherever contact of the film and adhesive is made. The result is that optically clear patterns may be created in the light-shaping diffuser substrate by applying an adhesive-backed film in a desired pattern. Examples of such a film are clear Mylar and colored gels. Such films may be self-adhesive or may have an adhesive material applied to one side prior to application to the light-shaping diffuser. The resulting effect is a pattern of substantially undiffused beams being projected within an otherwise lensed and diffused beam.

In any of these embodiments shown in FIG. 7, patterns may be colored by inserting or adhering one or more color filter films to the substrate. These may be absorptive color filters such as theatrical gel or may be other color filters, such as dichroic films. Colored filters may be used to fill clear spaces in an opaque pattern, to insert colored patterns into an otherwise clear beam, to produce undiffused colored areas within an otherwise diffused beam, as the scroll substrate to color all light passing through the gobo pattern, or in any combination of these options.

Figure 8:
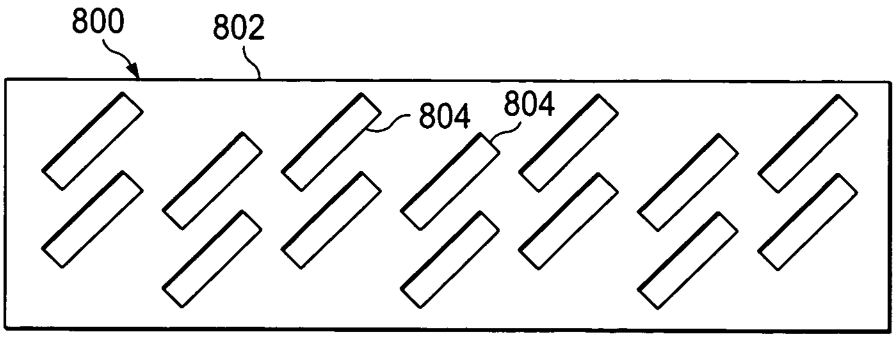

FIG. 8 shows pattern generator 800, covering several adjacent panels-for example, the panels V-Y of the diffusion/pattern string 310 described with regard to FIG. 3. In this example, patterns are cut from thin mirror-reflective Mylar with the cutouts 804 representing the positive (light) desired beam shape and the Mylar surface 802 representing the negative (dark) pattern which is to occlude a desired portion of the light beam. The Mylar is then bonded to a predetermined number of sequential panels of the diffusion/pattern string 310. The scrolling mechanism 110 may then be operated to position any predetermined area of the pattern generator 800 across the mouth of the reflector 104, thereby producing a light beam from the light fixture 100 having a desired pattern.

Alternatively, the scrolling mechanism 110 may be operated to scroll the diffusion/pattern string 310 back and forth between the panels V and Y, that is, back and forth across the pattern generator 800. Such continuous scrolling of the pattern generator 800 across the mouth of the reflector 104, would produce a light beam from the light fixture 100 having a changing, or animated, pattern.

The diffusion/pattern string 310 creates variations within a projected beam, either by occluding a portion of the beam so as to produce a projected pattern, by coloring portions of the beam to produce a multicolored projection, or by varying the optical qualities of the beam by varying the diffraction of the beam in a pattern.

By scanning the diffusion/pattern string 310 back and forth across the mouth of a parabolic or near-parabolic reflector 104, an operator can cause the patterns created by the string 310 appear to move within the field of projected light. The operator can vary a speed of this effect by varying a speed at which the scroll is driven. The operator may also produce flickering images by using these patterns in combination with a stationary pattern generator or when scanned in the opposite direction of, or at a different speed than, another diffusion/pattern string on a separate scrolling mechanism.

When used in a parabolic reflector system, properties of that optical system may result in a non-linear projection of the pattern of the diffusion/pattern string 310. Images at extreme ends of the axis of motion are distorted into a sharp curve, which "straightens out" as the pattern approaches the center of the beam, then again distorts as it traverses the beam further. By scanning the diffusion/pattern string 310 back and forth across the mouth of a parabolic or near-parabolic reflector 104, an operator can produce a "wrapping" effect in the pattern. An operator may also cause the appearance of a circular motion by placing a stationary pattern generator in a fixed position in a light beam and scanning the string 310 in the same beam.

With regard to the pattern generators 700 and 800 shown in FIGS. 7 and 8, the clear gel substrate to which the pattern is bonded may be replaced by a single color filter or may be a clear material with mosaic color sections applied at a desired cutout (positive) section or sections of the pattern, thereby producing a multicolored beam. Other materials than reflective Mylar may additionally or alternatively be used to form the pattern generators. Partially reflective material may be used to produce patterns with gray segments, rather than solely light or dark segments.

While pattern generators have been described with regard to FIGS. 3, 7 and 8 as being installed on the scrolling mechanism 110 of the light fixture 100, it will be understood that pattern generator panels may be installed additionally or alternatively on the scrolling mechanism 106 or 108. In this way, color, pattern, and diffusion panels may be used together in a desired combination.

Figure 9:
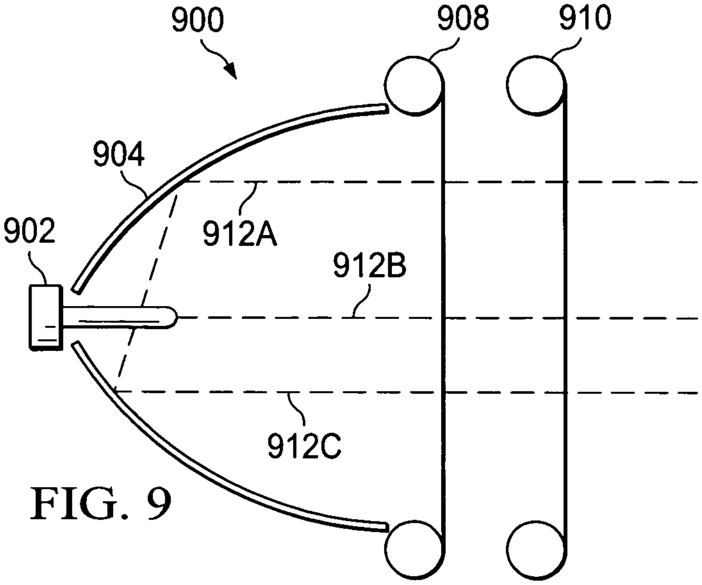
FIG. 9 shows another automated lighting fixture in accordance with the invention.

Another embodiment of the invention is illustrated in FIG. 9. As in the embodiment shown in FIG. 1, a light fixture 900 may include a light source 902, mounted substantially at the focus of a parabolic reflector 904. Light rays 912A-C emitted by the light source 902, emerge from the mouth of the reflector 904 substantially parallel to each other. A scrolling mechanism 908 carries a color filter string shown in FIG. 10. A scrolling mechanism 910 carries a diffusion string such as diffusion/pattern string 310.

Figure 10:
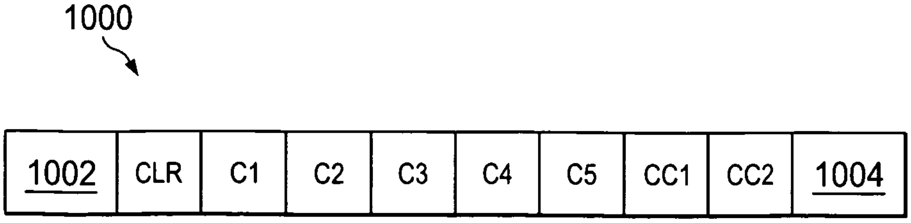
FIG. 10 depicts a color string that may be used in the embodiment of the invention shown in FIG. 9.

A color filter string 1000, shown in FIG. 10, may be used with the embodiment of the invention shown in FIG. 9. Panels 1002 and 1004 of leader material may be used to attach the color filter string 1000 to the rollers of the scrolling mechanism 908. Panel CLR may contain clear filter material, to allow the light fixture 900 to emit a white beam of light. Panels CC1 and CC2 may be color correction filters to appropriately color the beam of light for use in video or film applications. Panels C1-C5 may be color filter material of different colors.

If the scrolling mechanism 908 is operated to position the color filter string 1000 so that the panel C1 completely covers the mouth of the reflector 904, the beam of light from the light fixture 900 will be the color of the color filter material comprising the panel C1. The scrolling mechanism 910 may then be operated to position a desired area of the diffusion material it carries across the light beam to cause a desired amount of diffusion in the light beam. As the scrolling mechanism 908 is subsequently operated to move the panel C1 out of the light beam and the panel C2 into the beam, the color blending effect of the diffusion material will cause the color of the light beam to smoothly change from the color of the panel C1 to the color of the panel C2.

As will be understood, a light fixture according to the invention may have only a single scrolling mechanism, carrying a flexible material. The flexible material may be solely a diffusion material, where different areas of the material produce different amounts of diffusion in the light beam from the light fixture. Alternatively, the flexible material may also include other areas that additionally or alternatively cause color filtration of the light beam.

Similarly, a light fixture according to the invention may have a fourth scrolling mechanism. The flexible material carried by this mechanism may include only pattern generating panels, for combination with one scrolling mechanism carrying only diffusion material and two other scrolling mechanisms carrying only color filter material. Other combinations of flexible diffusion, color filter and pattern generating material carried by a scrolling mechanism may also be envisioned within the spirit and scope of the invention.

In addition, while the scrolling mechanisms of the light fixtures shown in FIGS. 1 and 9 have their rollers located on the same sides of the light beam, it will be understood that a scrolling mechanism may be rotated 90 degrees around the longitudinal axis of the light beam. Additionally, the flexible diffusion or color filter material might be wrapped around the rollers to extend between the sides of the rollers closest to the light source, as shown in the scrolling mechanism in FIG. 11. In this way, the rollers of two scrolling mechanisms might be positioned to lie in the same plane, thereby reducing the length of a light fixture in accordance with the invention.

While scrolling mechanisms have been shown herein for causing color filtration of the beam of light emitted by a light fixture according to the invention, it will be understood that other mechanisms for selectively filtering the light beam to a predetermined color may also be used without departing from the spirit and scope of the invention. For example, the light fixture may include a wheel with separated segments having different color filters, mounted such that the light beam emerging from the reflector passes through a desired segment of the wheel before passing through the flexible diffusion material.

Yet another embodiment of the invention is shown in FIG. 11. A light fixture 1100 includes a light source 1102 mounted in a reflector 1104. The housing of the light fixture 1100 extends beyond the mouth of the reflector 1104, enclosing a scrolling mechanism 1106 and forming mounting brackets 1112. A diffusion device 1110 is removably mounted to the light fixture, in this embodiment, by sliding the material into the mounting brackets 1112.

Alternatively, the scrolling mechanism 1106 may be placed in a separate housing, as shown in FIG. 2, and the housing mounted to the light fixture 1100. In such an embodiment, the diffusion device 1110 could be removably mounted to the housing of the scrolling mechanism 1106. While the embodiment of the invention shown in FIG. 11 provides for removably mounting the diffusion device 1110 to the light fixture 1100 by sliding it into the mounting brackets 1112, other techniques may be used instead, such as quick release fasteners or screws.

The scrolling mechanism 1106 may carry flexible material including clear material, color filters, or pattern generators. The diffusion device 1110 may be a holographic diffuser, however in this embodiment of the invention, the material need not be flexible.

If the scrolling mechanism 1106 carries flexible material including clear material and color filters, it may be positioned, as described with regard to FIGS. 4-6, to produce a light beam having portions of different colors, or having a white portion and a colored portion. In such a case, the diffusion device 1110 will operate to blend the differently colored portions of the light beam. In this way, the embodiment of the invention shown in FIG. 11 is capable of producing a uniformly colored light beam having a desired color or saturation.

FIGS. 12A-C illustrate a mounting apparatus 1200 for use with the embodiment of the invention shown in FIG. 11, where the diffusion material is flexible. A frame 1202 has an aperture 1204 to permit passage of the light beam from the light source 1102 and the reflector 1104. Held within the frame 1202, and extending across the aperture 1204, is flexible diffusion material 1206. Brads 1208 may be used to secure the frame 1202 and the diffusion material 1206 together.

FIG. 12A presents a front view of the apparatus 1200, while FIGS. 12B and 12C show top views of the apparatus in open and closed configurations, respectively. In FIG. 12B it is clear that the frame 1202 may have two parts, attached to each other along one edge by a hinge. When the frame parts are spread apart, as shown in FIG. 12B, the diffusion material 1206 may be placed between the parts. Once the frame parts are closed together, they capture the diffusion material 1206 between them.

The frame parts may remain in the closed position through the action of the hinge or other closure force. Friction between the frame parts and the diffusion material 1206 may be enough to prevent the diffusion material 1206 from slipping out of the frame 1202. Alternatively, one or more brads 1208 may be placed through the frame 1202 and the diffusion material 1206, to hold the frame parts together or to prevent the diffusion material 1206 from slipping out of the frame 1202.

The diffusion device 1110 may comprise a frame and diffusion material, even if the diffusion material isn't flexible. For example, if the diffusion material is delicate or brittle, a frame may be used to allow the diffusion material to be inserted and removed from the mounting brackets 1112 without damaging the diffusion material. Similarly, other mechanisms than the frame 1202 may be used to support the flexible diffusion medium 1206, such as a casing that holds the medium in tension or a clear, non-flexible panel upon which the flexible diffusion medium 1206 is mounted.

With the embodiment of the invention shown in FIG. 11, multiple diffusion devices 1110 may be prepared with diffusion material producing different amounts of diffusion in the light beam. In this way, a diffusion device 1110 may be selected and mounted to the light fixture 1100 in order to produce a desired amount of diffusion.

Figure 13:
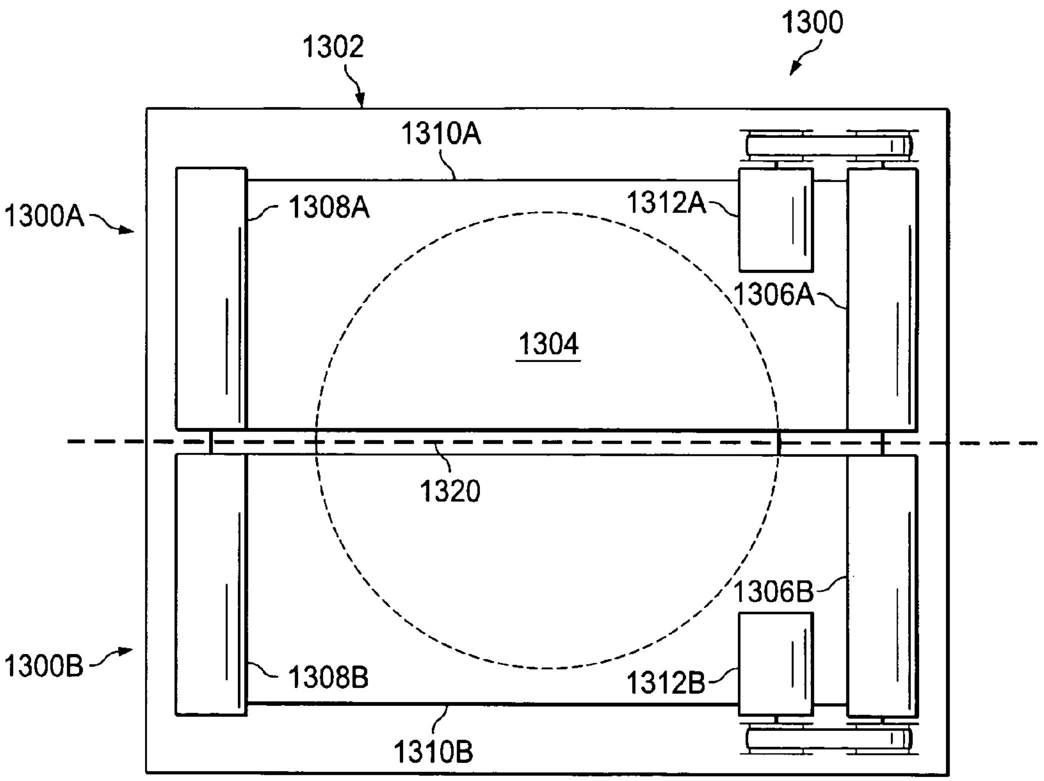
FIG. 13 is a back view of a scrolling mechanism in accordance with the invention for use in the light fixture of FIG. 9 or FIG. 11.

FIG. 13 shows an alternative color scrolling device 1300 for use in place of the scrolling mechanism 908 of the light fixture of FIG. 9 or the scrolling mechanism 1106 of the light fixture of FIG. 11. As described with regard to the scrolling mechanism 200, shown in FIG. 2, a housing 1302 may provide mechanical support for components of two scrolling mechanisms 1300A and 1300B, and an aperture 1304 allows a light beam to pass through the housing 1302 and color filter material 1310A and 1310B.

In the scrolling mechanism 1300A, the color filter material 1310A is wrapped at opposite ends around rollers 1306A and 1308A. As described with regard to the scrolling mechanism 200, a motor 1312A drives the roller 1306A while the roller 1308A maintains the color filter material 1310A in tension between the rollers 1306A and 1308A. The motor 1312A may be operated to position a desired area of the color filter material 1310A across the upper half of the aperture 1304. Similarly, in the scrolling mechanism 1300B, color filter material 1310B is wrapped at opposite ends around rollers 1306B and 1308B, and a motor 1312B drives the roller 1306B to position the color filter material 1310B across the bottom half of the aperture 1304.

In the color scrolling device 1300 shown in FIG. 13, a gap 1320 exists between the adjacent edges of the color filter materials 1310A and 1310B. The gap 1320 will allow white light to pass through the aperture 1304 even when both the color filter materials 1310A and 1310B are positioned so as to fully color their respective halves of the aperture 1304. In an alternative scrolling device, the rollers carrying the two pieces of color filter material might be offset relative to each other to reduce or eliminate the gap 1320. In another alternative, a strip of opaque material might be placed across the aperture 1304 to block the white light passing through the gap 1320.

Figure 14:
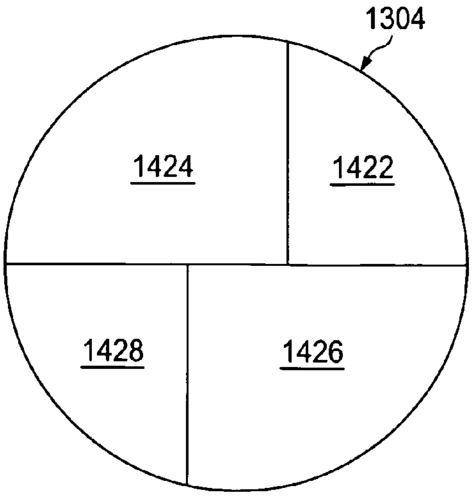
FIG. 14 is a schematic illustration of the operation of the scrolling mechanism shown in FIG. 13.

FIG. 14 illustrates the ability of the color scrolling device 1300 of FIG. 13 to mix colors additively and to control the color and saturation of the light beam together, or to control the saturation of the color independently. The motor 1312A has been operated to position red filter material (portion 1422) over part of the aperture 1304 and clear material (portion 1424) over the remainder of the aperture 1304. Likewise, the motor 1312B has been operated to position blue filter material (portion 1428) over part of the aperture 1304 and clear material (portion 1426) over the remainder of the aperture 1304. As a result, a portion of the light beam is read, another portion blue, and the remainder remains white.

If diffusion material has been positioned across the light beam after it passes through the color scrolling mechanism 1300, for example by scrolling mechanism 910 of FIG. 9 or by diffusion device 1110 of FIG. 11, the red, white, and blue portions of the light beam will be blended into a pale magenta light beam. If the motor 1306A is operated to increase the size of portion 1422, while portions 1426 and 1428 remain unchanged, thereby increasing the amount of red filter material and decreasing the amount of white light in the beam, the resulting color of the beam will move towards a rose color and become more saturated. Similarly, if the motor 1306B is operated to increase the size of portion 1428, while portions 1422 and 1424 remain unchanged, thereby increasing the amount of blue filter material and decreasing the amount of white light in the beam, the resulting color of the beam will move towards a lavender color and become more saturated.

If the motors 1306A and 1306B are operated in conjunction to simultaneously increase or decrease the sizes of portions 1422 and 1428, respectively, the color of the light beam will remain magenta while increasing or decreasing in saturation. Thus the motors 1306A and 1306B may be operated to change the color and saturation of the light beam together, or to change the saturation of the light beam independently.

Although the present invention has been described in detail, those skilled in the art should understand that various changes, substitutions and alterations may be made herein without departing from the spirit and scope of the invention in its broadest form.

Although the present invention and its advantages have been described in the foregoing detailed description and illustrated in the accompanying drawings, it will be understood by those skilled in the art that the invention is not limited to the embodiment(s) disclosed but is capable of numerous rearrangements, substitutions and modifications without departing from the spirit and scope of the invention as defined by the appended claims.

What is claimed is:

1. An apparatus comprising:

a first flexible material comprising a first area having a first texture that produces a first predetermined amount of diffusion of a beam of light, wherein the first texture produces at least some diffusion in the beam of light; and a second flexible material in contact with a first portion of the first area and a viscous material applied to the side of the second flexible material in contact with the first portion of the first area, wherein a second amount of diffusion is produced in a portion of the beam of light passing through the first portion of the first area, through the viscous material, and through the second flexible material, and wherein the second amount of diffusion is less than the first predetermined amount of diffusion.

2. The apparatus of claim 1, wherein the first flexible material further comprises a second area having a second texture that produces a third predetermined amount of diffusion of a beam of light, wherein the second texture produces at least some diffusion in the beam of light, the apparatus further comprising:

a third flexible material in contact with a second portion of the second area, wherein a fourth amount of diffusion is produced in a portion of the beam of light passing through the second portion of the second area and through the third flexible material, and wherein the fourth amount of diffusion is less than the third predetermined amount of diffusion.

3. The apparatus of claim 1, wherein the viscous material fills at least part of the first texture on the first flexible material and produces the second amount of diffusion of the beam of light produced in the portion of the beam of light passing through the first portion of the first area and through the second flexible material.

4. The apparatus of claim 1, wherein the second amount of diffusion is substantially no diffusion.

5. The apparatus of claim 1, wherein the second flexible material is one of a clear material and a color-filtering material.

6. The apparatus of claim 5, wherein the second flexible material is one of an absorptive color-filtering material and a dichroic film.

7. The apparatus of claim 1, wherein the first flexible material has a rectangular shape with a first side longer than a second side and the first area has a first axis longer than a second axis, the first axis of the first area parallel to the first side of the flexible material.

8. A light fixture, comprising:

a light source;

a first flexible material coupled to a first scrolling mechanism, the first scrolling mechanism operable to position a selected area of the first flexible material such that a bean of light from the light source passes through a first area of the first flexible material, the first area having a first texture that produces a first predetermined amount of diffusion of the beam of light, wherein the first texture produces at least some diffusion in the beam of light; and a second flexible material in contact with a first portion of the first area and a viscous material applied to the side of the second flexible material in contact with the first portion of the first area, wherein a second amount of diffusion is produced in a portion of the beam of light passing through the first portion of the first area, through the viscous material, and through the second flexible material, and wherein the second amount of diffusion is less than the first predetermined amount of diffusion.

9. The light fixture of claim 8, wherein the first flexible material further comprises a second area having a second texture that produces a third predetermined mount of diffusion of a beam of light, wherein the second texture produces at least some diffusion in the beam of light, the light fixture further comprising:

a third flexible material in contact with a second portion of the second area, wherein a fourth amount of diffusion is produced in a portion of the beam of light passing through the second portion of the second area and through the third flexible material, and wherein the fourth amount of diffusion is less than the third predetermined amount of diffusion.

10. The light fixture of claim 8, wherein the viscous material fills at least part of the first texture on the first flexible material and produces the second amount of diffusion of the beam of light produced in the portion of the beam of light passing through the first portion of the first area and through the second flexible material.

11. The light fixture of claim 8, wherein the second amount of diffusion is substantially no diffusion.

12. The light fixture of claim 8, wherein the second flexible material is one of a clear material, an absorptive color-filtering material and a dichroic film.

13. The light fixture of claim 8, wherein the first flexible material has a rectangular shape with a first side longer than a second side and the first area has a first axis longer than a second axis, the first axis parallel to the first side of the flexible material and the first axis longer than a width of a output aperture of the light fixture in a direction parallel to the first side of the flexible material.

14. The light fixture of claim 8 further comprising:

a motor configured to move the second flexible material across the light source to cause to the pattern to appear to move.

15. The apparatus of claim 1 further comprising:

a motor configured to move the second flexible material to cause the pattern to appear to move.

16. The apparatus of claim 1, wherein the viscous material is translucent.

17. The apparatus of claim 1, wherein the viscous material is optically transparent.

18. The apparatus of claim 1, further comprising a fourth flexible material in contact with a third portion of the first area, wherein the fourth flexible material is opaque.

19. The light fixture of claim 8, wherein the viscous material is translucent.

20. The light fixture of claim 8, further comprising a fourth flexible material in contact with a third portion of the first area, wherein the fourth flexible material is opaque.

* * * * *